United States Patent
Mirsch et al.

(10) Patent No.: US 12,045,041 B2
(45) Date of Patent: Jul. 23, 2024

(54) WIRELESS COMMUNICATION FOR INDUSTRIAL AUTOMATION

(71) Applicant: ABB Schweiz AG, Baden (CH)

(72) Inventors: Juha Mirsch, Helsinki (FI); Harri Mustonen, Helsinki (FI)

(73) Assignee: ABB Schweiz AG, Baden (CH)

( * ) Notice: Subject to any disclaimer, the term of this patent is extended or adjusted under 35 U.S.C. 154(b) by 483 days.

(21) Appl. No.: 17/329,420

(22) Filed: May 25, 2021

(65) Prior Publication Data

US 2021/0373540 A1    Dec. 2, 2021

(30) Foreign Application Priority Data

Jun. 2, 2020   (EP) .................................. 20177794

(51) Int. Cl.
| | |
|---|---|
| *G05B 19/4063* | (2006.01) |
| *G05B 19/418* | (2006.01) |
| *H04W 4/80* | (2018.01) |
| *H04W 12/55* | (2021.01) |

(52) U.S. Cl.
CPC ... *G05B 19/41855* (2013.01); *G05B 19/4063* (2013.01); *H04W 4/80* (2018.02); *H04W 12/55* (2021.01)

(58) Field of Classification Search
CPC ......... G05B 19/41855; G05B 19/4063; H04W 4/80; H04W 12/55
See application file for complete search history.

(56) References Cited

U.S. PATENT DOCUMENTS

| | | | | |
|---|---|---|---|---|
| 2019/0113896 A1* | 4/2019 | Hall | .................... | G05B 19/0428 |
| 2021/0254850 A1* | 8/2021 | Field | .................. | G05D 23/1931 |

FOREIGN PATENT DOCUMENTS

| | | |
|---|---|---|
| EP | 2846208 A2 | 3/2015 |
| EP | 2927854 A1 | 10/2015 |
| EP | 3462216 A1 | 4/2019 |
| WO | 2017117348 A1 | 7/2017 |

OTHER PUBLICATIONS

EP Search Report: Application No. EP20177794: Completed Oct. 20, 2020; 2 Pages.

* cited by examiner

*Primary Examiner* — Gary Collins
(74) *Attorney, Agent, or Firm* — Whitmyer IP Group LLC (57) ABSTRACT

A method including receiving, by an industrial automation device, operational information associated with an industrial asset, wherein the operational information is received from a sensor device via a first wireless connection. The method further includes transmitting, by the industrial automation device, the operational information and internal technical information associated with the industrial automation device to a cloud server via a second wireless connection. The method further includes adjusting, by the industrial automation device, one or more control parameter settings of the industrial automation device based at least partly on the operational information and the internal technical information.

19 Claims, 5 Drawing Sheets

WIRELESS COMMUNICATION FOR INDUSTRIAL AUTOMATION

TECHNICAL FIELD

Various exemplary embodiments relate to wireless communication.

BACKGROUND

An industrial automation device, for example a variable frequency drive, may be required to collect sensor measurements from one or more external sensors located in the surrounding environment. In order for the industrial automation device to be able to collect the sensor measurements from the one or more sensors, a data connection between the industrial automation device and the one or more sensors is required. The data connection may be provided for example as a fieldbus cable connection, but the industrial automation device may not be able to connect to some types of sensors, for example vibration sensors, by such means. However, an industrial automation device may be utilized such that better service may be provided for communicating with one or more external sensors.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an industrial automation device comprising means for receiving operational information associated with an industrial asset, wherein the operational information is received from a sensor device via a first wireless connection, transmitting the operational information to a cloud server via a second wireless connection, transmitting internal technical information associated with the industrial automation device to the cloud server via the second wireless connection, and adjusting one or more control parameter settings of the industrial automation device based at least partly on the operational information and the internal technical information.

According to another aspect, there is provided an industrial automation device comprising at least one processor, and at least one memory including computer program code, wherein the at least one memory and the computer program code are configured, with the at least one processor, to cause the industrial automation device to: receive operational information associated with an industrial asset, wherein the operational information is received from a sensor device via a first wireless connection, transmit the operational information to a cloud server via a second wireless connection, transmit internal technical information associated with the industrial automation device to the cloud server via the second wireless connection, and adjust one or more control parameter settings of the industrial automation device based at least partly on the operational information and the internal technical information.

According to another aspect, there is provided a system comprising at least at least one sensor device, an industrial automation device, and a cloud server. The at least one sensor device is configured to: measure operational information associated with an industrial asset, and transmit the operational information to the industrial automation device via a first wireless connection. The industrial automation device is configured to: receive the operational information from the sensor device via the first wireless connection, transmit the operational information to the cloud server via a second wireless connection, transmit internal technical information associated with the industrial automation device to the cloud server, and adjust one or more control parameter settings of the industrial automation device based at least partly on the operational information and the internal technical information. The cloud server is configured to receive the operational information and the internal technical information via the second wireless connection.

According to another aspect, there is provided a method comprising receiving, by an industrial automation device, operational information associated with an industrial asset, wherein the operational information is received from a sensor device via a first wireless connection; transmitting, by the industrial automation device, the operational information to a cloud server via a second wireless connection; transmitting, by the industrial automation device, internal technical information associated with the industrial automation device to the cloud server via the second wireless connection; and adjusting, by the industrial automation device, one or more control parameter settings of the industrial automation device based at least partly on the operational information and the internal technical information.

According to another aspect, there is provided a computer program comprising instructions which, when executed by one or more processors comprised in an industrial automation device, cause the industrial automation device to perform at least the following: collect operational information associated with an industrial asset from a sensor device via a first wireless connection, transmit the operational information to a cloud server via a second wireless connection, transmit internal technical information associated with the industrial automation device to the cloud server via the second wireless connection, and adjust one or more control parameter settings of the industrial automation device based at least partly on the operational information and the internal technical information.

According to another aspect, there is provided a computer readable medium comprising program instructions which, when executed by one or more processors comprised in an industrial automation device, cause the industrial automation device to perform at least the following: collect operational information associated with an industrial asset from a sensor device via a first wireless connection, transmit the operational information to a cloud server via a second wireless connection, transmit internal technical information associated with the industrial automation device to the cloud server via the second wireless connection, and adjust one or more control parameter settings of the industrial automation device based at least partly on the operational information and the internal technical information.

According to another aspect, there is provided a non-transitory computer readable medium comprising program instructions which, when executed by one or more processors comprised in an industrial automation device, cause the industrial automation device to perform at least the following: collect operational information associated with an industrial asset from a sensor device via a first wireless connection, transmit the operational information to a cloud server via a second wireless connection, transmit internal technical information associated with the industrial automation device to the cloud server via the second wireless connection, and adjust one or more control parameter settings of the industrial automation device based at least partly on the operational information and the internal technical information.

BRIEF DESCRIPTION OF THE DRAWINGS

In the following, various exemplary embodiments will be described in greater detail with reference to the accompanying drawings, in which.

DETAILED DESCRIPTION

The following embodiments are exemplary. Although the specification may refer to "an", "one", or "some" embodiment(s) in several locations of the text, this does not necessarily mean that each such reference is made to the same embodiment(s), or that a particular feature only applies to a single embodiment. Single features of different embodiments may also be combined to provide other embodiments.

Various exemplary embodiments may be applicable to any process in an industrial plant, including a processing system and/or an industrial manufacturing related process and/or a system for a technical process, which is at least partly automated, providing different measured/sensored values for a plurality of variables on one or more devices (equipment) and/or on one or more processes. A non-limiting list of examples includes power plants, pulp and paper plants, manufacturing plants, chemical processing plants, power transmission systems, mining and mineral processing plants, oil and gas systems, data centers, ships, and transportation fleet systems.

Different embodiments and examples are described below using single units, models, equipment and memory, without restricting the embodiments/examples to such a solution. Concepts called cloud computing and/or virtualization may be used. Virtualization may allow a single physical computing device to host one or more instances of virtual machines that appear and operate as independent computing devices, so that a single physical computing device can create, maintain, delete, or otherwise manage virtual machines in a dynamic manner. It is also possible that device operations will be distributed among a plurality of servers, nodes, devices or hosts. In cloud computing network devices, computing devices and/or storage devices provide shared resources. Some other technology advancements, such as Software-Defined Networking (SDN) may cause one or more of the functionalities described below to be migrated to any corresponding abstraction or apparatus or device. Therefore, all words and expressions should be interpreted broadly, and they are intended to illustrate, not to restrict, the exemplary embodiments.

Figure 1:
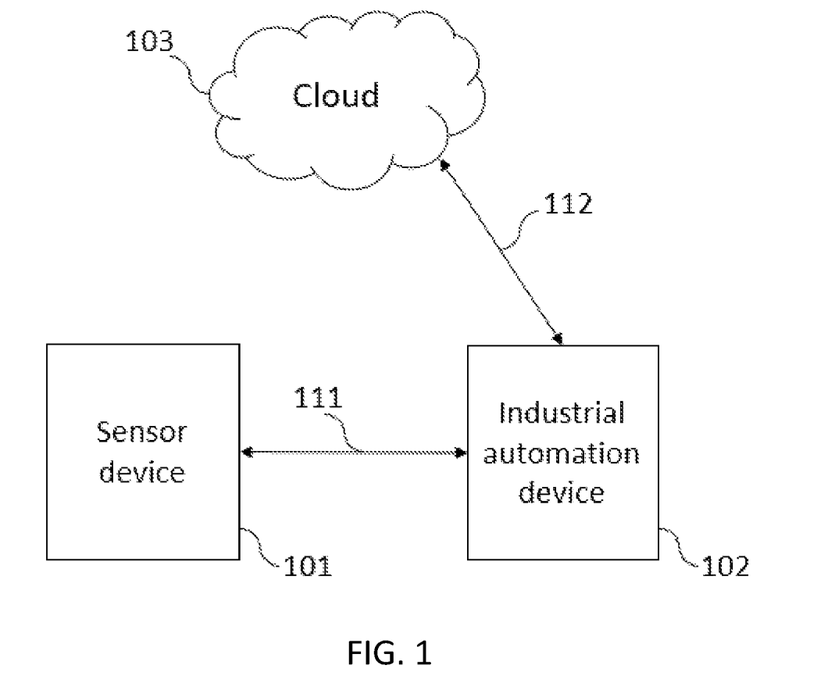
FIG. 1 illustrates a simplified architecture of a system.

FIG. 1 illustrates a wireless communication system to which some exemplary embodiments may be applied. Referring to FIG. 1, some exemplary embodiments may be based on wireless communications, such as 3G (third generation), 4G (fourth generation), LTE (long term evolution), LTE-A (long term evolution advanced), 5G (fifth generation), 5G NR (new radio), UMTS (universal mobile telecommunications system), EDGE (enhanced data rates for GSM evolution), WCDMA (wideband code division multiple access), Bluetooth, WLAN (wireless local area network), Wi-Fi, Li-Fi (light fidelity) or any other mobile or wireless network. In an exemplary embodiment, the communication may occur between nodes belonging to different but compatible systems, such as LTE and 5G.

FIG. 1 illustrates a system according to an exemplary embodiment. It should be noted that FIG. 1 illustrates a simplified system architecture only showing some elements and functional entities, all being logical units whose implementation may differ from what is shown. The connections shown in FIG. 1 are logical connections; the actual physical connections may be different. Data collection may use so-called master protocols, in which a master network node subscribes data from slaves (devices whose data it wants to have), and a slave device/network node sends its data to the receiver/master based on query or automatically based on subscription. It is apparent to a person skilled in the art that the systems also comprise other functions and structures. It should be appreciated that the functions, structures, elements, and protocols used in or for communication are irrelevant to the exemplary embodiments. Therefore, they need not be discussed in more detail here.

The system may comprise one or more sensor devices 101. The sensor device 101, which may also be referred to for example as an intelligent sensor or a smart sensor, may be a condition monitoring sensor that may be for example attached to or comprised in an industrial asset, i.e. machinery, such as a motor, a pump, a mounted bearing, a fan or a compressor. Further examples of an industrial asset may be an induction motor or an electric pump. The sensor device 101 may be configured to measure operational information, for example observed technical performance information such as measured values for temperature and/or vibration, associated with the industrial asset. The sensor device 101 may be configured to store the measured operational information for example in an internal memory of the sensor device 101. The sensor device 101 may be equipped with a short-range radio interface, for example Bluetooth or Li-Fi. The sensor device 101 may be further configured to exchange information, i.e. to transmit and/or receive data, with an industrial automation device 102 via a first wireless connection 111, for example a Bluetooth or Li-Fi connection. For example, the sensor device 101 may be configured transmit the measured operational information to the industrial automation device 102 via the first wireless connection 111.

The industrial automation device 102 may comprise a frequency converter, variable frequency drive, variable speed drive, motion drive, motion controller, motor, servomotor, AC/DC module, DC/AC module, DC/DC module, programmable logic controller (PLC), switch, soft starter, robot, or any other device used for industrial automation. The industrial automation device 102, for example a variable frequency drive, may be used to run machinery, which may also be referred to as an industrial asset, at different speeds. Examples of industrial assets are described above. The industrial automation device 102 may comprise or be connected to a controller, for example a proportional-integral-derivative, PID, controller. The controller may be configured to send control signals to the industrial automation device 102. The industrial automation device 102 may control highly dynamic industrial processes, in which for example the speed or torque applied to a motor has to be varied according to the needs of the industrial process.

The industrial automation device 102 may store, for example in an internal memory of the industrial automation device, information on control parameter settings, for example present values of control parameter settings such as controller gains, ramp times, motor data, limits, magnetization settings, signal filtering settings, and/or motor control settings. The industrial automation device 102 may also store internal technical information recorded during the operation of the industrial automation device, for example information on key performance indicators, such as load current histogram, torque ripple, torque vs. speed curves, and/or power vs. speed curves, temperature, voltage, current, and/or other information such as resonance frequencies and/or load inertias. The industrial automation device 102 may be equipped with a short-range radio interface, for example Bluetooth or Li-Fi. The radio interface may be comprised in the industrial automation device 102 or for example in a control panel of the industrial automation device 102.

The industrial automation device 102 may be configured to exchange information, i.e. to transmit and/or receive data, with the sensor device 101 via the first wireless connection 111. For example, the industrial automation device 102 may be configured to receive the operational information from the sensor device 101 via the first wireless connection 111. The industrial automation device 102, or the control panel of the industrial automation device 102, may be referred to as a master, and the sensor device 101 may be referred to as a slave. The industrial automation device may be further configured to store the received information in an internal memory of the industrial automation device 102. The industrial automation device 102 may be further configured to perform data analytics on the received operational information and/or the internal technical information of the industrial automation device 102.

Furthermore, the industrial automation device 102 may be connected to the internet via a network interface based on wireless communications, such as 3G, 4G, LTE, LTE-A, 5G, 5G NR, UMTS, EDGE, WCDMA, WLAN, Wi-Fi, Li-Fi, or any other mobile or wireless network. The network interface may be comprised for example in a control panel of the industrial automation device 102. The industrial automation device 102 may be configured to exchange information, i.e. to transmit and/or receive data, with a cloud server 103 via a second wireless connection 112, which provides internet connectivity. For example, the industrial automation device 102 may be configured to transmit the received operational information and/or the internal operational information of the industrial automation device 102 to the cloud server 103 via the second wireless connection 112.

The cloud server 103 may be configured to exchange information, i.e. to transmit and/or receive data, with the industrial automation device 102 via the second wireless connection 112. For example, the cloud server 103 may be configured to receive the operational information from the industrial automation device 102 via the second wireless connection 112. The cloud server 103 may be further configured to store the received information in an internal or external memory of the cloud server 103. The information stored by the cloud server 103 may be used for example by a remote condition monitoring application to monitor the operation of the industrial asset and/or the industrial automation device 102, and/or the stored information may be used by a data analytics application, such as a predictive analytics application that may for example predict faults or maintenance needs associated with the industrial asset and/or the industrial automation device 102. The cloud server 103 may be configured to run the remote condition monitoring application and/or the data analytics application.

In another exemplary embodiment, a user device may be connected to the cloud server for example via the internet, and the user device may be configured to run the remote condition monitoring application and/or the data analytics application. For example, the user device may be configured to visualize the operational information stored on the cloud server to a user in order to enable the user to remotely monitor the condition of an industrial asset. The user device may comprise for example a desktop computer, a laptop computer, a smartphone, a tablet computer, or any other computing device.

Figure 2:
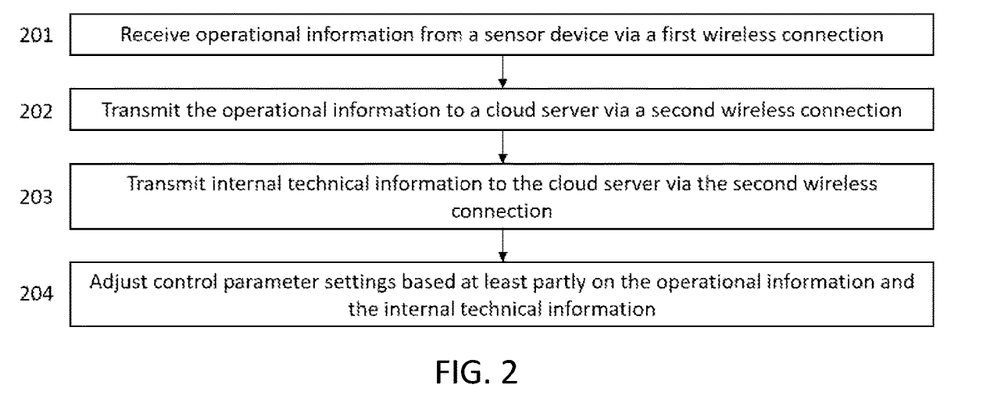
FIGS. 2-4 illustrate flow charts according to exemplary embodiments.

FIG. 2 illustrates a flow chart according to an exemplary embodiment. Referring to FIG. 2, an industrial automation device receives 201 a set of operational information associated with an industrial asset, wherein the set of operational information is received from a sensor device via a first wireless connection. The industrial automation device then transmits 202 the set of operational information to a cloud server via a second wireless connection. The industrial automation device also transmits 203 a set of internal technical information associated with the industrial automation device to the cloud server via the second wireless connection. The set of operational information and the set of internal technical information may be transmitted at the same time or separately. The industrial automation device adjusts 204 one or more control parameter settings of the industrial automation device based at least partly on the operational information and the internal technical information. In other words, the industrial automation device may act as both a sensor and an actuator.

In another exemplary embodiment, the process may be iterative, so that the industrial automation device is continuously receiving operational information from the sensor device, and continuously transmitting the received operational information and the internal technical information to the cloud server.

In another exemplary embodiment, the first wireless connection is established for example by using zero-touch Bluetooth pairing. Zero-touch Bluetooth pairing is a technique wherein a master, for example the industrial automation device or a control panel comprised therein, and a slave, for example the sensor device, both comprise a pre-shared link key enabling secure authentication without need for entering a PIN code, for example. Both the master and slave may act as a verifier and a claimant. The device that sends an LMP_au_rand protocol data unit, PDU, first may be referred to as an initiator. The initiator may send an LMP_au_rand PDU to a responder. If the responder has a link key associated with the initiator, it may respond with an LMP_au_rand PDU. The initiator and responder may calculate the response. The slave may respond first with an LMP_sres PDU comprising SRES_slave. The master may then respond with an LMP_sres PDU comprising SRES_master. The master may verify that the SRES_slave sent by the slave matches the SRES_slave calculated by the master. The slave may verify that the SRES_master sent by the master matches the SRES_master calculated by the slave. If the response is not correct, then either device may end the connection by sending an LMP_detach PDU with an error code indicating authentication failure.

In another exemplary embodiment, the second wireless connection is established for example via a cellular link, such as a narrowband internet of things, NB-IoT, connection.

In another exemplary embodiment, the industrial automation device receives operational information from a plurality of sensor devices via a plurality of first wireless connections.

In another exemplary embodiment, the industrial automation device uses a deterministic model to predict one or more future values, or an output of the model, based on the received operational information and the internal technical information associated with the industrial automation device. The deterministic model is a type of mathematical model, wherein no randomness is involved in determining future states of the modelled system. The industrial automation device may use the predicted one or more future values to adjust, or optimize, one or more control parameter settings of the industrial automation device. For example, model predictive control may be used to optimize the control parameter settings.

In another exemplary embodiment, the industrial automation device further comprises a user interface for enabling a user to trigger scanning of available sensor devices, presenting a list of the available sensor devices to the user, and/or enabling the user to select a sensor device from the list to establish a first wireless connection to.

Figure 3:
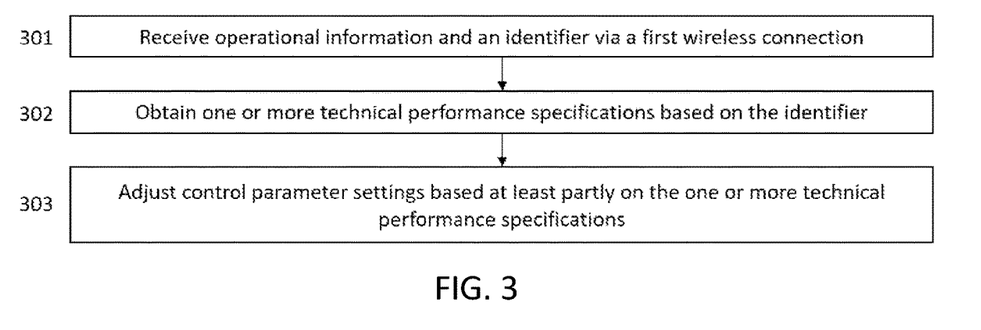

FIG. 3 illustrates a flow chart according to an exemplary embodiment, wherein automated commissioning of an industrial automation device is performed. Referring to FIG. 3, the industrial automation device receives 301 operational information and an identifier, such as a serial number, associated with an industrial asset from one or more sensors. The industrial asset may comprise for example a motor or a pump controlled by the industrial automation device, and the industrial automation device, for example a variable frequency drive, may for example feed power to the industrial asset. The industrial automation device then uses the identifier to obtain 302 information on one or more technical performance specifications, for example operating limits and/or a nominal value for current, voltage, frequency, speed, power, torque and/or power factor, associated with the industrial asset based on the identifier. Power factor may also be referred to as cos(φ). The one or more technical performance specifications may be obtained for example from a database comprised in an internal memory of the industrial automation device or in an external memory such as a cloud server. The industrial automation device then automatically adjusts 303 one or more control parameter settings of the industrial automation device for optimal control of the industrial asset, wherein the automatic adjusting is performed based at least partly on the received operational information and the one or more technical performance specifications associated with the industrial asset. This automatic adjusting may be referred to as an identification run, or ID run, in some exemplary embodiments.

In another exemplary embodiment, the industrial automation device, for example a variable frequency drive, uses the identifier associated with the industrial asset, for example a motor or a pump, to obtain one or more technical performance specifications comprising optimal control parameter settings for optimal control of the industrial asset. The optimal control parameter settings may be obtained for example from a database comprised in an internal memory of the industrial automation device or in an external memory such as a cloud server. The industrial automation device may then apply the obtained optimal control parameter settings. In other words, the industrial automation device may directly obtain optimal control parameter settings from the database based on the identifier without requiring to perform an ID run, for example.

Figure 4:
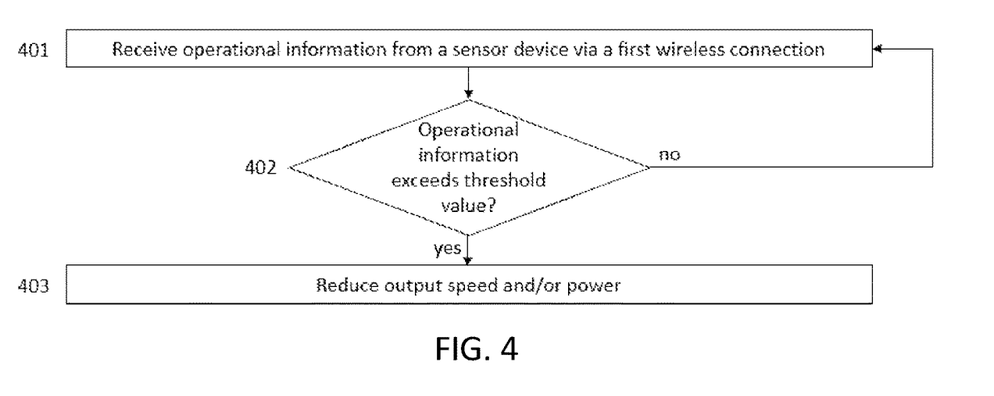

FIG. 4 illustrates a flow chart according to an exemplary embodiment, wherein an industrial automation device performs automated overheat protection for an industrial asset based on the received operational information. Referring to FIG. 4, the industrial automation device receives 401 operational information associated with an industrial asset from one or more sensors. The industrial asset may comprise for example a motor or a pump controlled by the industrial automation device, and the industrial automation device may for example feed power to the industrial asset. The operational information may comprise for example a temperature value associated with the industrial asset. The industrial automation device then checks 402 if the received operational information exceeds a pre-defined threshold value. If the received operational information exceeds the pre-defined threshold value (402: yes), the industrial automation device performs control action(s) for example by reducing 403 an output speed and/or an output power that is provided to the industrial asset from the industrial automation device. The industrial asset may for example be turned off by cutting power to it completely. This is done in order to bring the operational information, for example temperature, below the pre-defined threshold value. On the other hand, if the operational information does not exceed the pre-defined threshold value (402: no), the process may for example return to step 401.

Figure 5:
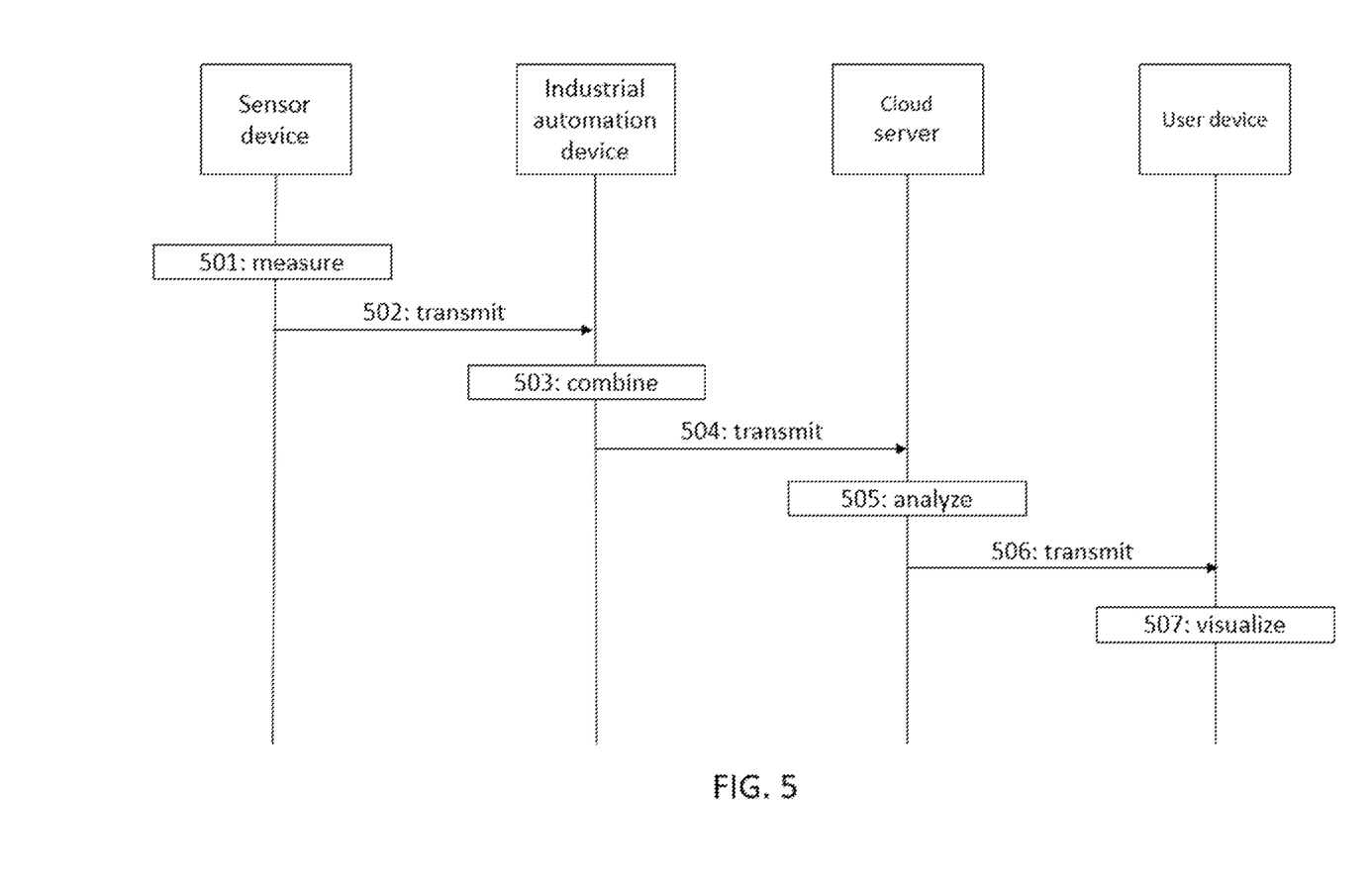
FIG. 5 illustrates a signalling diagram according to an exemplary embodiment.

FIG. 5 is a signalling diagram illustrating information exchange according to an exemplary embodiment. Referring to FIG. 5, a sensor device measures 501 operational information associated with an industrial asset, for example a motor, a pump, a mounted bearing, a fan or a compressor. The operational information may comprise for example observed technical performance information, such as one or more measured values for temperature and/or vibration, associated with the industrial asset. The sensor device then transmits 502 the measured operational information to an industrial automation device, for example a variable frequency drive, via a first wireless connection, for example a Bluetooth connection. The industrial automation device receives the operational information from the sensor device. The industrial automation device may combine 503 the received operational information with internal technical information of the industrial automation device, such as one or more recorded values for an input current and/or an output current that is fed to the industrial asset from the industrial automation device. By combining the received operational information, for example motor vibration information, with the internal technical information of the industrial automation device, the industrial automation device may analyze the combined information and perform improved control actions, for example current and/or frequency control, by adjusting one or more control parameter settings of the industrial automation device. The industrial automation device transmits 504 the operational information and the internal technical information to a cloud server via a second wireless connection, for example a cellular link such as an NB-IoT connection. The cloud server receives the operational information and the internal technical information from the industrial automation device. The cloud server may analyze 505, i.e. perform data analytics on the received operational information and/or the internal technical information of the industrial automation device. The cloud server may for example use a deterministic model to predict one or more future values, or an output of the model, based on the operational information and the internal technical information of the industrial automation device. The cloud server may for example predict maintenance needs associated with the industrial automation device and/or the industrial asset. The cloud server may further transmit 506 the received operational information, the internal technical information of the industrial automation device, and/or the analytics results to a user device. The user device may be configured to visualize 507 the received information for example to a user via a graphical user interface. The user device may comprise for example a desktop computer, a laptop computer, a smartphone, a tablet computer, or any other computing device.

In another exemplary embodiment, the cloud server may further determine one or more optimal control parameter settings for the industrial automation device based on the predicted one or more future values, and transmit the one or more optimal control parameter settings to the industrial automation device. The industrial automation device may then apply the received one or more optimal control parameter settings.

In some exemplary embodiments, the cloud server may use one or more machine learning models, such as a recurrent neural network, for predicting the one or more future values.

A technical advantage provided by some exemplary embodiments may be that they may enable direct wireless communication between an industrial automation device and one or more sensor devices without requiring for example a separate gateway device in between the industrial automation device and the one or more sensor devices to forward the information. Moreover, some exemplary embodiments may enable direct wireless communication between the industrial automation device and a cloud server, and thus simplify the transfer of sensor measurements to a cloud server. In other words, the industrial automation device itself may act as a gateway for one or more sensor devices in order to provide sensor data to a cloud server, while collecting the sensor data for itself at the same time. Furthermore, some exemplary embodiments may reduce latency and/or increase reliability of connectivity between the sensor device and the cloud server, since there are less devices/gateways on the path. Additionally, the zero-touch Bluetooth pairing technique according to some exemplary embodiments may simplify connection establishment between the industrial automation device and the one or more sensor devices. Some exemplary embodiments may also enable sensor measurements, for example motor vibration data, to be combined with internal technical information of the industrial automation device, which may enable improved data analytics for example in the cloud server or locally in the industrial automation device, as deterministic and independent from an existing operational technology, OT, network. In other words, data analytics based on deterministic modelling may be enabled by collecting information from two or more data points, such as a sensor device and the industrial automation device. Deterministic modelling may improve accuracy of predicting correct outcomes for predictive analytics, for example compared to using a probabilistic model, which may also be referred to as a stochastic model. Reliability, stability, and/or efficiency of the industrial automation device and/or other machinery may be increased by controlling the industrial automation device based on predictive analytics using deterministic modelling. In other words, some exemplary embodiments may provide improved control, for example current and/or frequency control, of an industrial automation device such as a variable frequency drive by combining the sensor measurements, for example motor vibration information, with the internal technical information of the industrial automation device, such as the output current that is fed to the motor from the variable frequency drive.

Figure 6:
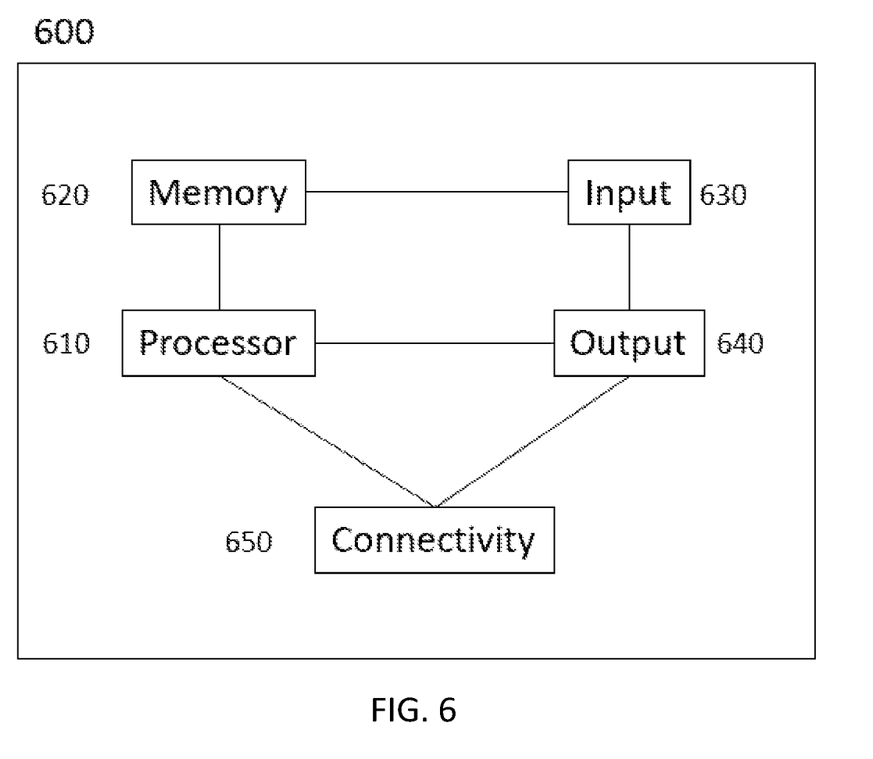
FIGS. 6 and 7 illustrate apparatuses according to exemplary embodiments.

FIG. 6 illustrates an apparatus 600, which may be an apparatus such as, or comprised in, a sensor device or a user device according to an exemplary embodiment. The apparatus 600 comprises a processor 610. The processor 610 interprets computer program instructions and processes data. The processor 610 may comprise one or more programmable processors. The processor 610 may comprise programmable hardware with embedded firmware and may, alternatively or additionally, comprise one or more application specific integrated circuits, ASICs.

The processor 610 is coupled to a memory 620. The processor is configured to read and write data to and from the memory 620. The memory 620 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 620 stores computer readable instructions that are executed by the processor 610. For example, non-volatile memory stores the computer readable instructions and the processor 610 executes the instructions using volatile memory for temporary storage of data and/or instructions.

The computer readable instructions may have been pre-stored to the memory 620 or, alternatively or additionally, they may be received, by the apparatus, via electromagnetic carrier signal and/or may be copied from a physical entity such as computer program product. Execution of the computer readable instructions causes the apparatus 600 to perform functionality described above.

In the context of this document, a "memory" or "computer-readable media" may be any non-transitory media or means that can contain, store, communicate, propagate or transport the instructions for use by or in connection with an instruction execution system, apparatus, or device, such as a computer.

The apparatus 600 further comprises, or is connected to, an input unit 630. The input unit 630 comprises one or more interfaces for receiving input. The one or more interfaces may comprise for example one or more motion and/or orientation sensors, one or more temperature sensors, one or more cameras, one or more accelerometers, one or more microphones, one or more buttons and one or more touch detection units. Further, the input unit 630 may comprise an interface to which external devices may connect to, and/or a user interface that a user may use to enter one or more inputs to the apparatus 600.

The apparatus 600 may also comprise an output unit 640. The output unit may comprise or be connected to one or more displays capable of rendering visual content such as a light emitting diode, LED, display, a liquid crystal display, LCD or a liquid crystal on silicon, LCoS, display.

The apparatus 600 may further comprise a connectivity unit 650. The connectivity unit 650 enables wired and/or wireless connectivity to external networks and/or devices. The connectivity unit 650 may comprise one or more antennas and one or more receivers that may be integrated to the apparatus 600 or the apparatus 600 may be connected to. The connectivity unit 650 may comprise an integrated circuit or a set of integrated circuits that provide the wireless communication capability for the apparatus 600. Alternatively, the wireless connectivity may be a hardwired application specific integrated circuit, ASIC.

It is to be noted that the apparatus 600 may further comprise various components not illustrated in FIG. 6. The various components may be hardware components and/or software components.

Figure 7:
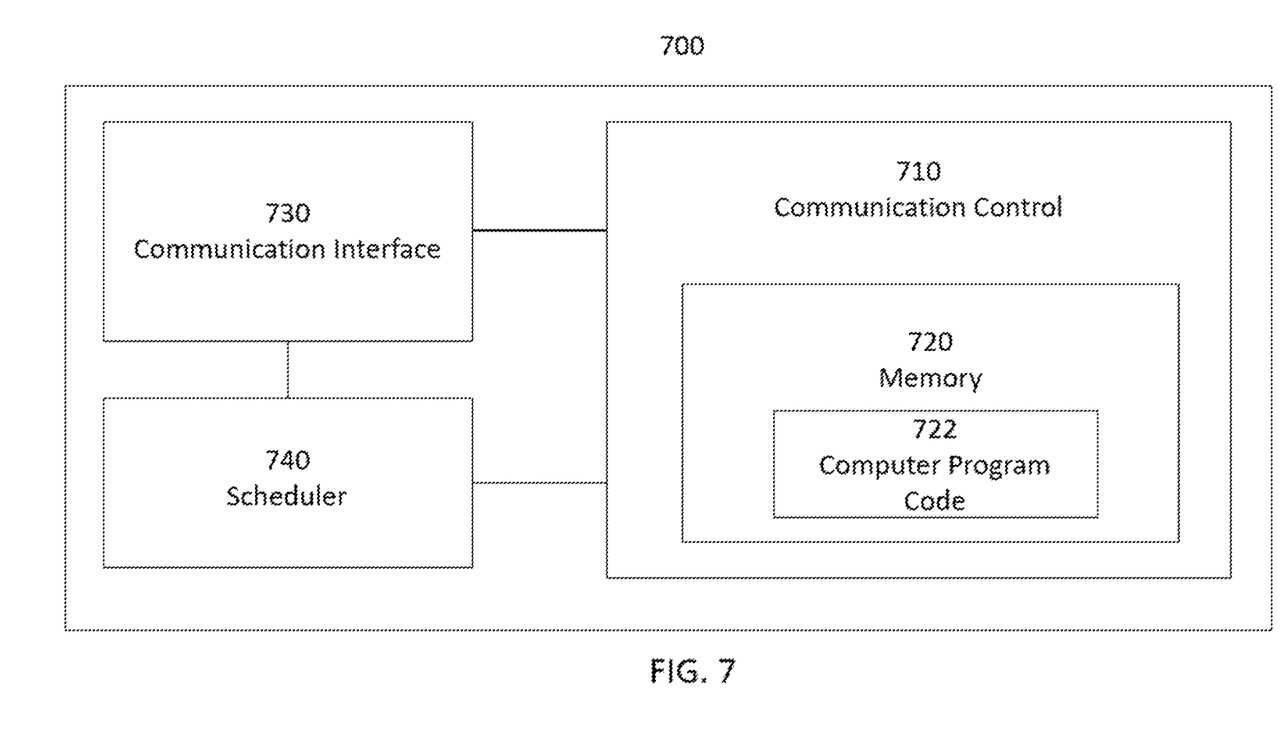

The apparatus 700 of FIG. 7 illustrates an exemplary embodiment of an apparatus that may be an industrial automation device or comprised in an industrial automation device. The apparatus may comprise, for example, a circuitry or a chipset applicable for realizing any of the exemplary embodiments described above. The apparatus 700 may be an electronic device comprising one or more electronic circuitries. The apparatus 700 may comprise a communication control circuitry 710 such as at least one processor, and at least one memory 720 including a computer program code (software) 722 wherein the at least one memory and the computer program code (software) 722 are configured, with the at least one processor, to cause the apparatus 700 to carry out any one of the exemplary embodiments described above.

The memory 720 may be implemented using any suitable data storage technology, such as semiconductor-based memory devices, flash memory, magnetic memory devices and systems, optical memory devices and systems, fixed memory and removable memory. The memory may comprise a configuration database for storing for example configuration data.

The apparatus 700 may further comprise a communication interface 730 comprising hardware and/or software for realizing communication connectivity according to one or more wired and/or wireless communication protocols. The communication interface 730 may provide the apparatus with radio communication capabilities. The communication interface may, for example, provide a radio interface to one or more other devices. The apparatus 700 may further comprise another interface towards a core network such as a network coordinator apparatus and/or to the access nodes of a cellular communication system. The apparatus 700 may further comprise a scheduler 740 that is configured to allocate resources.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s)), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus (es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given drawings, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An industrial automation device comprising:
at least one processor,
at least one memory storm information on control parameter settings for running an industrial asset and internal technical information associated with the industrial automation device itself which is recorded during operation of the industrial automation device, the at least one memory storing computer program code,
a radio interface providing communication with a sensor device via a first wireless connection, and
a network interface providing communication with a cloud server via a second wireless connection,
wherein the at least one memory and the computer program code are configured, with the at least one processor, to cause the industrial automation device to:
receive operational information associated with the industrial asset from the sensor device via the first wireless connection, the operational information being measured by the sensor device which is attached to or comprised in the industrial asset;
transmit the operational information associated with the industrial asset to the cloud server via the second wireless connection;
transmit the internal technical information associated with the industrial automation device to the cloud server via the second wireless connection;
adjust one or more of the control parameter settings of the industrial automation device based at least partly on the operational information and the internal technical information.

2. The industrial automation device of claim 1, wherein the industrial automation device is further caused to establish the first wireless connection using zero-touch Bluetooth pairing.

3. The industrial automation device of claim 1, wherein the industrial automation device is further caused to establish the second wireless connection via a cellular link.

4. The industrial automation device of claim 1, wherein the operational information comprises one or more measured values at least for a vibration associated with the industrial asset.

5. The industrial automation device of claim 1, wherein the operational information comprises one or more measured values at least for a temperature associated with the industrial asset.

6. The industrial automation device of claim 1, wherein the internal technical information comprises at least a value for an output current from the industrial automation device to the industrial asset.

7. The industrial automation device of claim 1, wherein the industrial automation device is further caused to predict one or more future values based on the operational information and the internal technical information by using a deterministic model.

8. The industrial automation device of claim 7, wherein the deterministic model is a type of mathematical model where no randomness is involved in determining the one or more future values; and
wherein the one or more of the control parameter settings of the industrial automation device are adjusted based on the one or more futures values.

9. The industrial automation device of claim 1, wherein the industrial automation device is further caused to:
receive an identifier associated with the industrial asset;
obtain one or more technical performance specifications associated with the industrial asset based on the identifier; and
adjust the one or more of the control parameter settings of the industrial automation device based at least partly on the one or more technical performance specifications.

10. The industrial automation device of claim 1, wherein the industrial automation device is further caused to reduce an output speed and/or an output power from the industrial automation device to the industrial asset, if the received operational information exceeds a pre-defined threshold value.

11. The industrial automation device of claim 1, wherein the industrial automation device comprises a variable frequency drive.

12. The industrial automation device of claim 1, wherein the at least one processor is configured to perform data analytics on the operational information associated with the industrial asset and the internal technical information associated with the industrial automation device.

13. The industrial automation device of claim 1, wherein the operational information and the internal technical information are transmitted to the cloud server at the same time.

14. A system comprising:
at least one sensor device attached to or comprised in an industrial asset,
an industrial automation device having at least one memory storing internal technical information associated with the industrial automation device itself, a radio interface providing communication with a sensor device via a first wireless connection, and a network interface providing communication with a cloud server via a second wireless connection, and
a cloud server;
wherein the at least one sensor device is configured to:
measure operational information associated with the industrial asset;
transmit the operational information to the industrial automation device via the first wireless connection;
wherein the industrial automation device is configured to:
receive the operational information from the sensor device via the first wireless connection;
transmit the operational information to the cloud server via the second wireless connection;
transmit the internal technical information associated with the industrial automation device to the cloud server via the second wireless connection;
adjust one or more control parameter settings of the industrial automation device based at least partly on the operational information and the internal technical information; and
wherein the cloud server is configured to:
receive the operational information and the internal technical information via the second wireless connection.

15. The system of claim 14, wherein the cloud server is further configured to predict one or more future values based on the operational information and the internal technical information by using a deterministic model.

16. The system of claim 14, further comprising a user device connected to the cloud server, wherein the user device is configured to visualize the operational information and/or the internal technical information to a user.

17. The system of claim 14, wherein the industrial automation device comprises a variable frequency drive, and the industrial asset includes a motor or a pump.

18. A method comprising:
receiving, by an industrial automation device, operational information associated with an industrial asset, wherein the operational information is measured by a sensor device that is attached to or comprised in the industrial asset, wherein the operational information is received from the sensor device via a first wireless connection which is provided by a radio interface of the industrial automation device;
transmitting, by the industrial automation device, the operational information to a cloud server via a second wireless connection which is provided by a network interface of the industrial automation device;
transmitting, by the industrial automation device, internal technical information associated with the industrial automation device itself and stored in a memory of the industrial automation device to the cloud server via the second wireless connection; and
adjusting, by the industrial automation device, one or more control parameter settings of the industrial automation device based at least partly on the operational information and the internal technical information.

19. A non-transitory computer readable medium comprising program instructions which, when executed by one or more processors included in an industrial automation device, cause the industrial automation device to perform at least the following:
collect operational information associated with an industrial asset from a sensor device via a first wireless connection, wherein the operational information is measured by the sensor device which attached to or comprised in the industrial asset, wherein the first wireless connection is provided by a radio interface of the industrial automation device;

transmit the operational information to a cloud server via a second wireless connection which is provided by a network interface of the industrial automation device;

transmit internal technical information associated with the industrial automation device itself and stored in a memory of the industrial automation device to the cloud server via the second wireless connection; and adjust one or more control parameter settings of the industrial automation device based at least partly on the operational information and the internal technical information.

\* \* \* \* \*